United States Patent Office 3,462,675
Patented Aug. 19, 1969

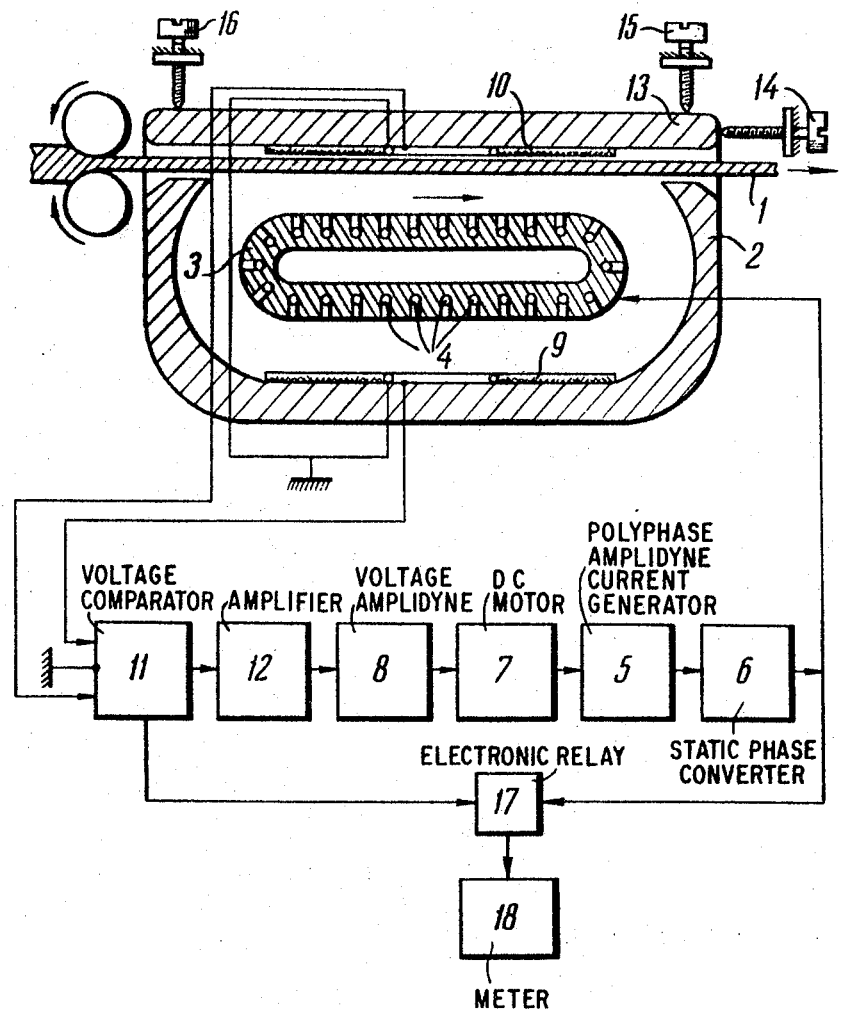

3,462,675
DEVICE FOR NONCONTACT MEASUREMENT OF SPEED OF MOVING STRIP OF ELECTRICALLY CONDUCTIVE MATERIAL
Lev Vladimirovich Pivovarov, ulitsa Lunacharskago 2, kv. 13, Kramatorsk, and Leonid Vasilievich Karnjushin, ulitsa Kultury 9, kv. 52, Kharkov, U.S.S.R.
Filed Oct. 26, 1966, Ser. No. 589,618
Int. Cl. G01r 11/02
U.S. Cl. 324—70       7 Claims

ABSTRACT OF THE DISCLOSURE

A device for noncontact measurement of the speed of electroconductive strips such as metallic strip rolled in mills of cold and heat rolling, said device comprising a linear stator fed from a current generator to produce a controlled travelling magnetic field, measuring coils being placed in the magnetic field on either side of the path of travel of the strip, one coil being directly influenced by said magnetic field, the other by said field through the intermediary of said strip. An automatic synchronization system is provided for maintaining the speed of the travelling magnetic field equal to to the strip speed and an automatic measuring circuit serves to measure the excitation current frequency of the travelling field at the synchronous mode of operation, said current frequency being proportional to the speed of the strip.

---

The present invention relates to devices for noncontact measurement of the speed of electrically conductive extended objects and, more particularly, to devices for controlling the speed of moving metal strips rolled in cold- and hot-rolling mills.

Prior art devices for noncontact measurement of the speed of rolled metal strips employ photocell elements and are based on the correlation method of measurement.

However, these devices have found limited application in the rolling of metals, since they are cumbersome, unreliable in operation, and complicated in design.

It is therefore an object of the present invention to provide a reliable and sufficiently accurate device for noncontact measurement of the speed of strips of electrically conductive materials.

Another object of the present invention is to provide a device, relatively simple in design and small in overall size, for noncontact measurement of the speed of rolled metal strips.

A particular object of this invention is to provide a noncontact device with measuring means responsive to the speed of the strip being controlled and having a minimum sensitivity with respect to variations in temperature and thickness of the strip.

These objects are achieved in a device which, according to the present invention, comprises a controlled source of travelling magnetic field and measuring coils arranged on either side of the moving strip path in the travelling magnetic field with the possibility of electromagnetic interaction with the strip and connected to a phase-sensitive arrangement operatively associated, in turn, with the source of travelling magnetic field to maintain automatically the speed of the field equal to that of the strip being controlled.

In a preferred embodiment of the invention the source of travelling magnetic field is a linear polyphase stator fed from a controlled polyphase cycle generator.

The polyphase stator may have a closed magnetic core, and be enclosed in an external magnetic conductor and a ferromagnetic screening envelope.

The phase-sensitive arrangement may comprise a phase-detector which, being connected to the measuring coils, extracts the differential E.M.F. which is then amplified and fed to the control winding of a rotary amplifier whose armature is coupled to a D.C. motor operatively associated with the polyphase cycle generator.

It is preferable to mount one of the measuring coils on the movable yoke of the external magnetic conductor of the stator, said yoke being adjusted to compensate the electromotive forces induced in the coils when the controlled strip is out of the magnetic field of the stator.

It is also preferable that a frequency meter, the scale of which is calibrated in units of the strip speed, be connected, at least when the speed of the field is synchronized with that of the moving strip under control, to the field winding of the stator.

It is also advisable to use a surface wound stator.

One of the possible embodiments of this invention will now be described with reference to the accompanying drawing which is a schematic diagram of the device for noncontact measurement of the speed of rolled metal strips.

A rolled metal strip 1 is passed through the air gap of an external magnetic conductor 2 of a polyphase linear stator 3 with a field winding 4 fed from a controlled polyphase generator 5 via a static phase converter 6. The generator is driven by a motor 7 supplied by a voltage amplidyne 8.

Measuring coils 9 and 10 are fixedly mounted on the external magnetic conductor 2 of the linear stator 3 at the opposite sides of the strip under control. The coils are connected in opposition and coupled to a phase-sensitive detector or voltage comparator 11, the output of which is connected, via an electronic amplifier 12, to the control winding of the voltage amplidyne 8.

The measuring coil 10 is mounted on an adjustable yoke 13 of the external magnetic conductor 2.

Adjusting screws 14, 15 and 16 are used for changing the position of the yoke 13 and coil 10.

When excited, the winding 4 of the stator 3 induces a magnetic field travelling at a certain speed in the direction of the movement of the strip 1 being controlled.

While the strip 1 is not in the air gap between the stator 3 and yoke 13, the measuring coil 10 is adjusted relative to the coil 9 by means of the adjusting screws 14, 15 and 16 so that the differential E.M.F. taken off the outputs of the coils 9 and 10 by the detector 11 is zero. This corresponds to the full amplitude and phase compensation of the electromotive forces induced in the coils by the travelling magnetic field.

When the strip 1 is passing through the air gap of the external magnetic conductor 2 at a speed synchronized with that of the travelling magnetic field, the mutual compensation of the electromotive forces is not disturbed, as the synchronously moving strip 1 does not shield the travelling magnetic field.

Any departure in the speed of the strip 1 from that of the travelling magnetic field causes amplitude and phase shift of the electromotive forces at the outputs of the measuring coils 9 and 10 due to shielding of the coil 10 by the production of Foucault currents in the strip 1.

The phase-sensitive detector 11 responds to the differential E.M.F. of the coil 9 and 10 and produces a voltage signal, corresponding to the differential E.M.F. in magnitude and phase, which through the electronic amplifier 12 is applied to the control winding of the rotary amplifier 8, thereby changing the output voltage of the amplifier 8 and the rotational speed of the shaft of motor 7. The frequency at the output of the controlled polyphrase generator 5 changes accordingly so that the speed of the traveling magnetic field becomes synchronized with that of the strip 1 and the differential E.M.F. at the outputs of the coils 9 and 10 tends to zero.

When the above described synchronization is achieved, the phase-sensitive detector 11 actuates a relay 17 which connects the field winding of the linear stator 3 to a pointer or digital frequency meter 18, the scale of which is calibrated in the units of the strip speed.

The measurement of the strip speed is taken only when the field is moving synchronously with the rolled strip, which fact increases the accuracy of the speed measurement.

To reduce ripple components of the travelling magnetic field, use is made of the linear stator 3 with a closed core and an increased number of phases (actually six phases are sufficient), which operates under conditions close to no-load. To reduce the deleterious effects of external magnetic fields upon the accuracy of measurement and to improve the magnetic and electrical symmetry, the stator 3 and magnetic conductor 2 are enclosed in an external ferromagnetic envelope (not shown).

In order to reduce the influence of the tooth harmonic components of the magnetic field on the accuracy of measurements it is advisable to use a "smooth," slotless stator with a field winding wound directly upon its surface and to increase the air gap between the stator 3 and external magnetic conductor 2.

The device proposed herein makes it possible to measure the speed of cold- and hot-rolled strips made of magnetic or nonmagnetic material before and after the rolling mill which allows the relative deformation reduction of the strip to be measured. The device may be used for measuring the length of a rolled strip and also for maintaining its speed at a constant preset value.

We claim:

1. A device for noncontact measurement of the speed of a strip of electrically conductive material, mainly of a rolled metal strip, comprising means including a stator for producing a controlled travelling magnetic field; means for passing the strip whose speed is to be measured in proximity to said stator and thereby to said field; a first measuring coil positioned adjacent said stator and being influenced by only said traveling magnetic field; a second measuring coil positioned adjacent said stator with said strip intermediate said second coil and said stator, said second measuring coil being influenced by said traveling magnetic field and by magnetic fields produced by currents induced in said strip by said traveling magnetic field; phase-sensitive means connected to said measuring coils and to said means for producing a traveling magnetic field to automatically maintain the speed of said magnetic field equal to that of the moving strip under control; and means for indicating the speed of travel of said strip when the speed of the magnetic field is equal to that of the moving strip.

2. A device for noncontact measurement of the speed of electrically conductive objects, mainly of rolled metal strips, comprising a polyphase current generator; a polyphase linear stator fed from said current generator and producing a travelling magnetic field; means for passing the strip whose speed is to be measured in proximity to said stator and thereby to said field; a first measuring coil positioned adjacent said stator and being influenced by only said traveling magnetic field; a second measuring coil positioned adjacent said stator with said strip intermediate said second coil and said stator, said second measuring coil being influenced by said traveling magnetic field and by magnetic fields produced by currents induced in said strip by said traveling magnetic field; phase-sensitive means connected to said measuring coils and said polyphase current generator to automatically control the generator and maintain the speed of the travelling magnetic field equal to that of the moving strip under control; and means connected to said generator for indicating the speed of travel of said strip when the speed of the magnetic field is equal to that of the moving strip.

3. A device for noncontact measurement of the speed of electrically conductive strips comprising a polyphrase current generator; a polyphase linear stator fed from said generator to produce a traveling magnetic field; means for passing the strip whose speed is to be measured in proximity to said stator and thereby to said field; a first measuring coil positioned adjacent said stator and being influenced by only said traveling magnetic field; a second measuring coil positioned adjacent said stator with said strip intermediate said second coil and said stator, said second measuring coil being influenced by said traveling magnetic field and by magnetic fields produced by current induced in said strip by said traveling magnetic field; a phase-sensitive detector connected to said measuring coils to extract a differential E.M.F. measured by said coils; an amplidyne having a control winding fed with the differential E.M.F. from said phase-sensitive detector; a D.C. motor coupled to said amplidyne for control of its speed thereby; said polyphase current generator being driven by said D.C. motor to automatically maintain the speed of said travelling magnetic field equal to that of the strip; and means connected to said generator for indicating the speed of travel of said strip when the speed of the magnetic field is equal to that of the moving strip.

4. A device for noncontact measurement of the speed of a strip of electrically conductive material comprising a polyphase current generator; a polyphase linear stator fed from said generator and having an external magnetic conductor with a movable yoke; means for passing the strip whose speed is to be measured in proximity to said stator and thereby to said field; a first measuring coil positioned adjacent said stator and being influenced by only said traveling magnetic field; a second measuring coil positioned adjacent said stator with said strip intermediate said second coil and said stator, said second measuring coil being influenced by said traveling magnetic field and by magnetic fields produced by currents induced in said strip by said traveling magnetic field; at least one of said coils being mounted on said movable yoke which is adjusted to compensate the electromotive forces induced in said measuring coils when the strip is out of the magnetic field of said stator; phase-sensitive means connected to said measuring coils and to said current generator to automatically maintain the speed of said travelling magnetic field equal, in magnitude and direction, to that of said moving strip; and means connected to said generator for indicating the speed of travel of said strip when the speed of the magnetic field is equal to that of the moving strip.

5. A device as claimed in claim 4, in which said polyphase linear stator is formed with a closed magnetic core and is enclosed in an external ferromagnetic screening envelope.

6. A device for noncontact measurement of the speed of electrically conductive strips comprising a polyphase current generator; a polyphase linear stator including a field winding fed from said generator to produce a travelling magnetic field; means for passing the strip whose speed is to be measured in proximity to said stator and thereby to said field; a first measuring coil positioned adjacent said stator and being influenced by only said traveling magnetic field; a second measuring coil positioned adjacent said stator with said strip intermediate said second coil and said stator, said second measuring coil being influenced by said traveling magnetic field and by magnetic fields produced by currents induced in said strip by said traveling magnetic field; means mounting said coils for movement relative to one another to compensate the electromotive forces induced in said coils when the strip is out of the magnetic field of said stator; phase-sensitive means connected to said measuring coils and to said polyphase current generator to automatically maintain the speed of the magnetic field which is travelling in the same direction with said moving strip, equal to that of said trip; a frequency meter having a scale calibrated in units of speed and connected, at least when the speeds of said travelling magnetic field and said strip are synchronized, to the field winding of said polyphase stator.

7. A device as claimed in claim 6 wherein said linear stator has a smooth surface and the field winding is wound directly on said smooth surface of the linear stator.

References Cited

UNITED STATES PATENTS

| 2,706,805 | 4/1955 | Clewell | 324—70 |
| 2,941,145 | 6/1960 | Roberts | 324—70 |
| 3,353,131 | 11/1967 | Stubbs | 324—70 |

FOREIGN PATENTS

| 150,169 | 1962 | U.S.S.R. |
| 906,712 | 9/1962 | Great Britain. |
| 1,157,500 | 5/1958 | France. |

RUDOLPH V. ROLINEC, Primary Examiner

M. J. LYNCH, Assistant Examiner